US007037611B2

United States Patent
Gore et al.

(10) Patent No.: US 7,037,611 B2
(45) Date of Patent: May 2, 2006

(54) FUEL CARTRIDGE FOR USE WITH FUEL CELL

(75) Inventors: Makarand Gore, Corvallis, OR (US); James Guo, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 412 days.

(21) Appl. No.: 10/412,039

(22) Filed: Apr. 11, 2003

(65) Prior Publication Data
US 2004/0202904 A1   Oct. 14, 2004

(51) Int. Cl.
*H01M 8/04* (2006.01)
*H01M 8/06* (2006.01)

(52) U.S. Cl. .......................... 429/20; 429/26; 429/12; 429/34; 48/118.5

(58) Field of Classification Search ................ None
See application file for complete search history.

(56) References Cited

U.S. PATENT DOCUMENTS

| 4,225,320 | A | 9/1980 | Gell |
| 6,228,519 | B1 | 5/2001 | Faris et al. |
| 6,296,960 | B1 | 10/2001 | Faris et al. |
| 6,410,174 | B1 | 6/2002 | Faris |
| 6,653,007 | B1 * | 11/2003 | McWhorter ................ 429/19 |
| 6,790,416 | B1 * | 9/2004 | Mann et al. ............... 422/211 |
| 2002/0106501 | A1 | 8/2002 | Debe |
| 2003/0054217 | A1 | 3/2003 | Faris |
| 2003/0186111 | A1 * | 10/2003 | Tamakoshi ................ 429/62 |
| 2003/0234172 | A1 * | 12/2003 | Arthur et al. .......... 204/157.15 |

FOREIGN PATENT DOCUMENTS

| EP | 1367025 | 12/2003 |
| WO | WO0113445 | 2/2001 |
| WO | WO0144737 | 6/2001 |

* cited by examiner

Primary Examiner—John S. Maples (57) ABSTRACT

Representative embodiments provide for a fuel cartridge including a film strip supporting a fuel compound. An electric heater of the fuel cartridge is configured to heat a portion of the film strip, wherein the fuel compound is configured to liberate hydrogen gas from the heated usable portion of the film strip. The fuel cartridge is configured to provide the hydrogen gas to a fuel cell by way of a fluid coupling there between. The fuel cartridge is configured to support the film strip and the electric heater in a substantially self contained arrangement. A method includes supporting a film strip including a fuel compound within a fuel cartridge, heating a portion of the film strip within the fuel cartridge, and providing hydrogen gas liberated by the heating to a fuel cell.

21 Claims, 10 Drawing Sheets

FUEL CARTRIDGE FOR USE WITH FUEL CELL

BACKGROUND

A variety of portable electrically powered devices are known in the electrical and related arts. Examples of such devices include, for example, cellular phones, laptop computers, personal digital assistants (PDAs), still and/or video cameras, telecommunications equipment, etc. These and other such portable devices are powered by a number of different kinds of electrical energy sources. Non-limiting examples of such electric energy sources include storage batteries, primary cell batteries, charged capacitors, photovoltaic cells, etc.

Generally, it is an ongoing pursuit of the electrical arts to decrease the overall size and weight of portable electrically powered devices, while simultaneously increasing the total electrical energy (i.e., device running time) that is available from the corresponding electrical energy source. Furthermore, another general pursuit of the electrical arts is to provide electrical energy sources that can be recharged or 'refreshed' in as short a period of time as possible.

One type of electrical energy source that is being increasingly utilized toward these goals is the fuel cell. Broadly speaking, fuel cells are electrochemical devices that consume fuel (commonly in the form of gaseous hydrogen) and oxygen (commonly extracted from ambient air), and convert these materials into usable quantities of electrical energy and water, wherein most or all of the water is typically eliminated as a waste product. Fuel cells generally exhibit a number of relative advantages over some other kinds of portable-use electrical energy sources. Such advantages can include, for example: relatively fast refueling times; construction from environmentally inert or 'benign' materials; relatively long usable lives; the use of hydrogen fuel derivable from a variety of abundant resources; waste water discharge is non-toxic; etc.

Because fuel cells consume fuel (i.e., hydrogen) during operation, this fuel resource must be replenished over time. As it is generally desirable to keep fuel cell systems as lightweight and compact as possible, it is also desirable to provide mechanisms and methods for delivering fuel resources to these fuel cell systems that are correspondingly lightweight and compact.

Therefore, it is desirable to provide fuel delivery mechanisms and methods for use with fuel cells that exhibit reduced weight and size relative to the prior art.

SUMMARY

The embodiments herein disclosed are for illustrative purposes and should not be construed as limiting the invention.

One embodiment provides for a fuel cartridge for use with a fuel cell including a film strip supporting a fuel compound containing hydrogen, and an electric heater configured to controllably heat a usable portion of the film strip in response to electrical energy provided by a heater control, wherein the fuel compound is configured to liberate a hydrogen gas from the heated usable portion of the film strip, and wherein the fuel cartridge is configured to provide the hydrogen gas to the fuel cell by way of a fluid coupling there between. The fuel cartridge also includes a reel configured to support a portion of the film strip, wherein the fuel cartridge is configured to support the film strip and the electric heater and the reel in a substantially self contained arrangement.

Another embodiment provides for a fuel cartridge for use with a fuel cell, including a housing, a film strip supported within the housing, wherein the film strip supports a fuel compound containing hydrogen, and a supply reel supported substantially within the housing and configured to support an unused portion of the film strip. The fuel cartridge also includes an electric heating element supported within the housing and configured to controllably heat a portion of the film strip in response to an energizing of the electric heating element by a correspondingly coupled heater control, wherein the fuel compound is configured to liberate a hydrogen gas from the heated portion of the film strip, and wherein the housing is further configured to provide the liberated hydrogen gas to the fuel cell by way of a fluid coupling there between. The fuel cartridge further includes a takeup reel supported substantially within the housing and configured to controllably accumulate a used portion of the film strip away from the electric heating element in response to a controlled rotation of the takeup reel by a correspondingly coupled drive mechanism, wherein an unused portion of the film strip is drawn from the supply reel to the electric heating element in correspondence to the accumulation of the used portion of the film strip by the takeup reel.

Yet another embodiment provides for a fuel cartridge for use with a fuel cell, including a housing, a film strip supporting a fuel compound containing hydrogen, and a spring presser assembly supported by the housing and configured to support a first portion of the film strip in substantially spirally wound contact with an inner surface of the housing. The fuel cartridge also includes an electric heating element supported by the housing and configured to controllably heat a portion of the film strip in response to an energizing of the electric heating element by a correspondingly coupled heater control, wherein the fuel compound is configured to liberate a hydrogen gas from the heated portion of the film strip, and wherein the housing is further configured to provide the liberated hydrogen gas to the fuel cell by way of a fluid coupling there between. The fuel cartridge also includes a reel supported by the housing and configured to support a second portion of the film strip in substantially concentric inside relationship with the first portion of the film strip.

Still another embodiment of the invention provides an electrical apparatus, including a fuel cell configured to consume hydrogen gas and oxygen and to generate electrical energy in response to the consuming the hydrogen gas and the oxygen, and a fuel cartridge fluidly coupled to the fuel cell and configured to provide the hydrogen gas to the fuel cell. The fuel cartridge includes a film strip supporting a fuel compound containing hydrogen, and an electric heating element configured to heat a portion of the film strip. The fuel compound is configured to liberate the hydrogen gas in response to the heating of the portion of the film strip by the electric heating element. The electrical apparatus also includes an electric load electrically coupled to the fuel cell and configured to receive electrical energy from the fuel cell by way of the coupling, the electric load further configured to perform a predefined operation in response to receiving the electrical energy from the fuel cell.

Yet another embodiment of the invention provides a method of providing fuel to a fuel cell, including supporting a film strip including a fuel compound containing hydrogen within a fuel cartridge, controllably heating a portion of the film strip within the fuel cartridge to liberate a hydrogen gas from the fuel compound, and providing the liberated hydrogen gas to the fuel cell.

Still another embodiment of the invention provides for a method of providing fuel to a fuel cell, including supporting a film strip including a fuel compound containing hydrogen within a cartridge, controllably heating a portion of the film strip within the cartridge, and liberating a hydrogen gas from the fuel compound in response to the heating. The method further includes providing the liberated hydrogen gas to the fuel cell, controllably rotating a portion of the cartridge, accumulating a used portion of the film strip in response to the rotating, and supplying an unused portion of the film strip to be heated in correspondence to the accumulating the used portion of the film strip.

Yet another embodiment of the invention provides a fuel cartridge for use with a fuel cell, including a housing, a hydrogen bearing film supported within the housing, and a heater within the housing and configured to heat a portion of the hydrogen bearing film to thereby release hydrogen for use by the fuel cell and thereby produce a used portion of the hydrogen bearing film, and wherein the used portion of the hydrogen bearing film is contained within the housing.

These and other aspects and embodiments will now be described in detail with reference to the accompanying drawings, wherein:

DETAILED DESCRIPTION

In representative embodiments, the present teachings provide methods and apparatus for fuel cartridges, including a film strip supporting a fuel compound, configured to controllably supply gaseous hydrogen to a fuel cell.

Figure 1:
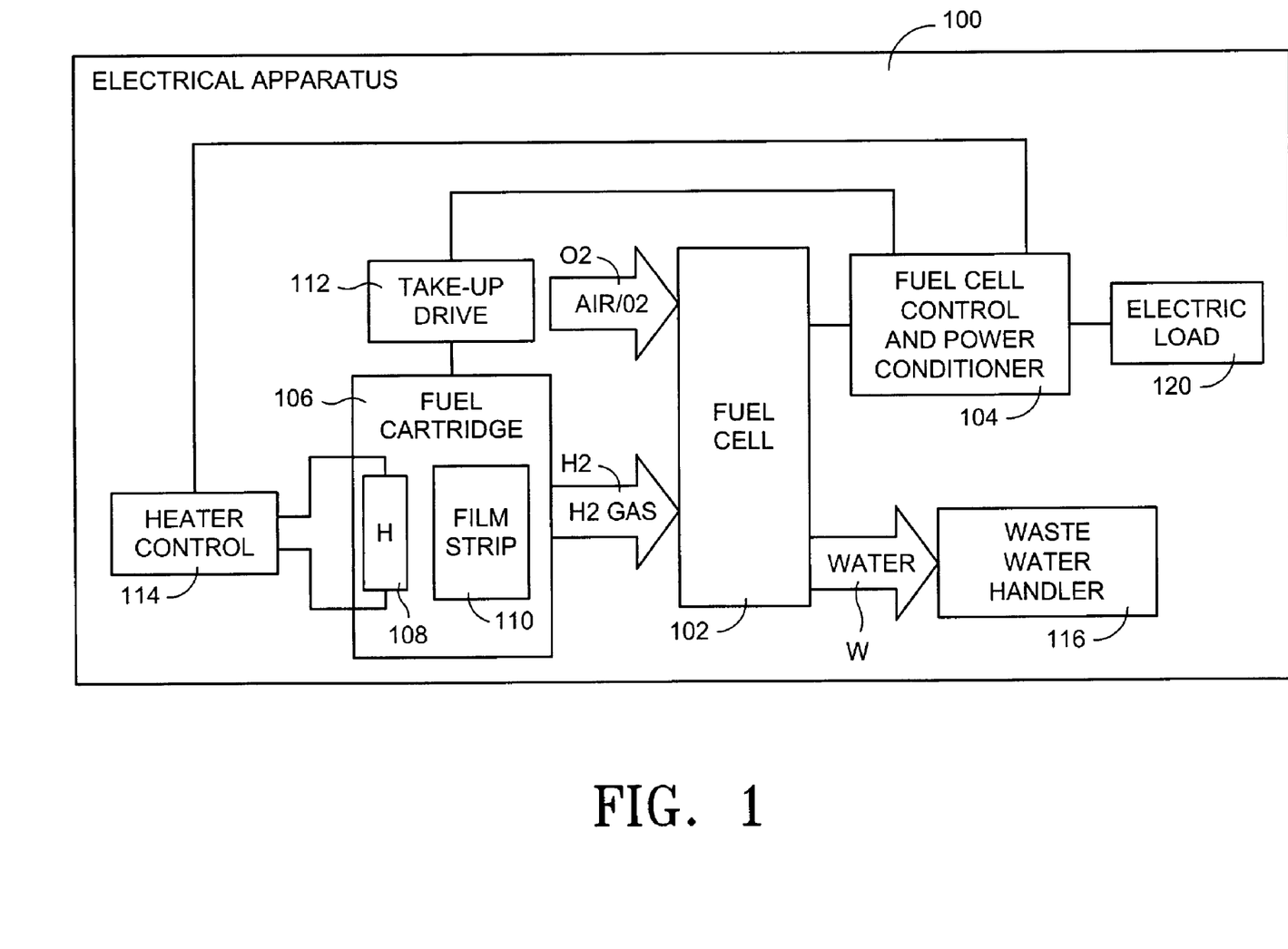
FIG. 1 is a block diagram depicting an electrical apparatus in accordance with an embodiment of the present invention.

Turning now to FIG. 1, a side elevation sectional view depicts a block diagram of an electrical apparatus 100 in accordance with the present invention. The electrical apparatus 100 includes a fuel cell 102. The fuel cell 102 can be defined by any fuel cell type suitable for use with the electrical apparatus 100. As depicted in FIG. 1, the fuel cell 102 is assumed to be a proton exchange membrane (PEM) type fuel cell. In another embodiment (not shown), the fuel cell 102 is another suitable fuel cell type. In any case, the fuel cell 102 is generally configured to consume hydrogen fuel H2 and oxygen O2 and to generate usable amounts of electrical power (i.e., electrical energy), while also producing water "W" as a waste product. Further description of the performance of the fuel cell 102 is provided hereafter.

The electrical apparatus 100 also includes a fuel cell controller and power conditioner (hereafter, controller) 104. The controller 104 is coupled in electrical and signal communication with the fuel cell 102. The controller 104 can be defined by any suitable electrical and/or electronic circuitry that is configured to receive electrical power generated by the fuel cell 102, to monitor one or more operating parameters of the fuel cell 102 (such as, for example, temperature, cell voltage, cell humidity, etc.), and to provide control signals and/or power to the fuel cell 102 and other devices (described in detail hereafter) of the apparatus 100 in correspondence to the normal operation of the fuel cell 102. As such, the controller 104 can include, for example: A microprocessor or microcontroller; digital, analog, and/or hybrid circuitry; solid-state and/or electromechanical switching devices; a storage battery; one or more ultra-capacitors; sensing instrumentation; etc.

The controller 104 is further configured to suitably condition electrical power received from the fuel cell 102 and to provide (i.e., output or supply) the conditioned electrical power to an electric load 120. Non-limiting examples of such electrical power conditioning can include: Voltage boosting, bucking, or other voltage regulation; noise filtering; voltage sag or spike filtering; direct-current to alternating-current inversion; over-current protection; fuel cell shunting; etc. Any suitable combination of these or other forms of power conditioning can be provided by a correspondingly configured embodiment of the controller 104, as desired, to satisfy the power requirements of the electric load 120 and/or to protect the fuel cell 102 from electrically-related damage.

The electric load 120 can include any suitable electrical and/or electronic devices or circuitry required for the normal operation of the electrical apparatus 100. Non-limiting examples of such electrical and/or electronic devices or circuitry can include: Motors; solenoids; relays; electro-optics; microprocessors and/or microcontrollers; heating elements; radio frequency circuitry; data storage devices; state machines; measurement and/or control instrumentation; operator interface devices; etc. In general, the electric load 120 can be defined by any electrically energized device, devices, and/or circuitry associated with the normal use and function of the electrical apparatus 100.

The electrical apparatus 100 also includes a fuel cartridge 106. The fuel cartridge 106 can be defined by any suitable embodiment of fuel cartridge in accordance with the present invention. Fuel cartridges of the present invention are respectively described in particular detail hereafter. As depicted in FIG. 1, the fuel cartridge 106 includes an electric heating element (i.e., electric heater) 108 and a film strip 110. The film strip 110 supports a fuel compound (not shown in FIG. 1) containing hydrogen. The fuel cartridge 106 is generally configured to generate and provide the hydrogen fuel H2 to the fuel cell 102, by way of any suitable fluid coupling there between.

The electrical apparatus 100 also includes a take-up drive mechanism (hereafter, take-up drive) 112. The take-up drive 112 is coupled in control signal communication with the controller 104, and is mechanically coupled with the fuel cartridge 106. The take-up drive 112 can be defined by any suitable electromechanical mechanism configured to provide a controllable (i.e., speed regulated) mechanical rotation that is coupled to the fuel cartridge 106, in response to a corresponding control signal provided by the controller 104. Further elaboration of the take-up drive 112 is provided hereafter, in association with the typical operation of the electrical apparatus 100.

The electrical apparatus 100 further includes a heater control 114. The heater control 114 is coupled in electrical and control signal communication with the controller 104, and is coupled in electrical communication with the electric heating element 108 of the fuel cartridge 106. The heater control 114 can be defined by any suitable electrical circuitry that is configured to provide a controllable (i.e., voltage and/or current regulated) supply of electrical energy to the electric heating element 108, in response to a corresponding control signal provided by the controller 104. Further elaboration of the heater control 114 is provided hereafter, in association with the typical operation of the electrical apparatus 100.

Typical operation of the electrical apparatus 100 is generally performed as follows: To begin, it is assumed that normal operation of the electric load 120 has been initiated by way of a suitable user interface (not shown) included therewith. The controller 104 senses a demand for electrical energy by the electric load 120, and issues a corresponding control signal and electrical heater power to the heater control 114, by way of a "boot-strapping" or "start-up" electrical charge stored in a storage battery, ultra-capacitor, etc., of the controller 104. The heater control 114 energizes the electric heating element 108 of the fuel cartridge 106, in response to receiving the control signal and electrical heater power from the controller 104.

The electric heating element 108 produces heat in response to the energization by the heater control 114, which is thermally coupled to an adjacent (i.e., cooperatively positioned) portion of the film strip 110 of the fuel cartridge 106. The fuel compound (not shown) supported by the adjacent portion of the film strip 110 liberates hydrogen gas H2 in response to the heating by the electric heating element 108. The liberated hydrogen gas H2 is fluidly coupled (i.e., provided or supplied) to the fuel cell 102.

The fuel cell 102 receives the hydrogen gas H2, which it uses in conjunction with oxygen O2 extracted from ambient air, to generate electrical power and waste water "W". The generated electrical power is coupled to and received by the controller 104, where it is suitably conditioned and provided to the electric load 120. The waste water "W" is coupled to a waste water handler 116 of the electrical apparatus 100. The waste water handler 116 is configured to handle the waste water W in any of a number of suitable ways such as, for example: Retention in a storage bladder for later emptying; absorption by a suitable medium and evaporated there from over time; recycled for use in satisfying a humidity requirement of the fuel cell 102; etc. (not shown, respectively).

As typical operation of the electrical apparatus 100 progresses, the hydrogen content of the fuel compound supported by the heated portion of the film strip 110 is depleted, requiring that an unused portion of the film strip 110 be brought into cooperative adjacency with the heating element 108. The control 104 senses a need to refresh the hydrogen-supplying portion of film strip 110 within the fuel cartridge 106 (by way, for example, of sensing a decline in the generated voltage of the fuel cell 102, etc.), and issues a corresponding control signal to the take-up drive 112. The take-up drive 112 provides a controlled mechanical rotation to the fuel cartridge 106, which serves to draw the just-used portion of the film strip 110 away from the electric heating element 108. As the film strip 110 is in the form of a continuous length of flexible material, an unused portion of the film strip 110 is brought into cooperative adjacency with the electric heating element 108 in correspondence to the used portion of the film strip 110 that is drawn away.

The controller 104 then issues a signal to the take-up drive 112 to stop the controlled mechanical rotation, so that the just-provided unused portion of the film strip 110 can be heated by the electric heating element 108, thus liberating additional hydrogen gas H2 for consumption by the fuel cell 102. This typical operation of the electrical apparatus 100 then continues substantially as described above, in an iterative or substantially continuous manner, as desired, until the electric load 120 is deactivated by way of a corresponding user input. At such time, the controller 104 issues (or ceases to issues, as appropriate) control signals to the heater control 114 and the take-up drive 112 resulting in the general shut-down of the electrical apparatus 100. The electrical apparatus 100 is now assumed to be in a generally de-energized standby state, awaiting the next user initiated operation of the electric load 120.

One of skill in the related arts can appreciate that the fuel cell 102, the controller 104, the take-up drive 112, the heater control 114, and the waste water handler 116 can be respectively defined and configured in a variety of suitable forms, and coupled in cooperation with the fuel cartridge 106 of the present invention so that the electrical energy requirements of the electric load 120 of the electrical apparatus 100 are suitably provided.

The fuel cartridge 106 of the present invention is configured to be readily replaceable within the electrical apparatus 100, in a minimal amount of time generally comparable to that of replacing a conventional primary-cell battery. Also, the fuel cartridge 106 of the present invention is configured to support and utilize the film strip 110 in a highly space-efficient manner, thus providing a fuel cartridge 106 that occupies a substantially minimized overall volume within the electrical apparatus 100. Furthermore, the fuel cartridge 106 of the present invention is configured to store and controllably supply an overall quantity of hydrogen gas H2 (fuel) to the fuel cell 102 resulting in generally desirable total operating times for the electric load 120 of the electrical apparatus 100.

These and other desirable characteristics of the fuel cell 106 shall be made apparent by the detailed descriptions of the various respective embodiments of the present invention, provided hereafter.

Figure 2:
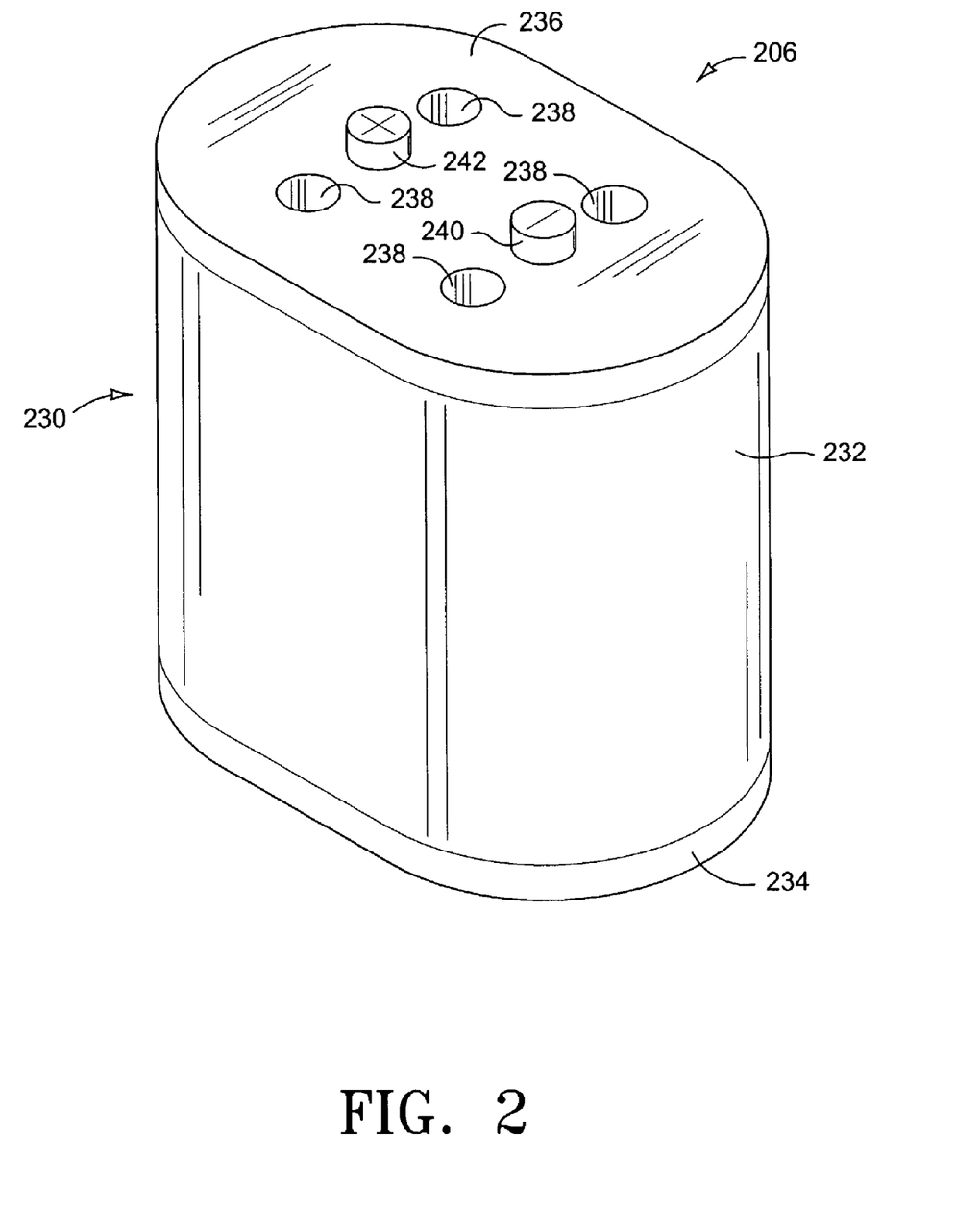
FIG. 2 is a perspective view depicting a fuel cartridge in accordance with another embodiment of the present invention.

FIG. 2 is a perspective view depicting a fuel cartridge 206 in accordance with one embodiment of the present invention. The fuel cartridge 206 includes a housing 230. The housing 230 includes a side wall 232. As depicted in FIG. 2, the side wall 232 has a generally oval cross-sectional shape. Other embodiments of the side wall 232 (not shown) that include other cross-sectional shapes can be used. The side wall 232 can be formed from any suitable material such as, for example, plastic, metal, etc. The housing 230 also includes a bottom 234. The bottom 234 is coupled with the side wall 232, and can be formed from any suitable material such as, for example, those listed above in regard to the formation of the side wall 232.

The housing 230 further includes a top 236. The top 236 is coupled with the side wall 232 and is disposed in a general opposite-end relationship with the bottom 234. The top 236 can be formed from any suitable, non-electrically conductive material such as plastic, etc. The top 236 includes a plurality of gas vents (i.e., fluid ports) 238, each configured to permit fluid coupling of the fuel cartridge 206 with a fuel cell (not shown in FIG. 2, refer to FIG. 1).

The fuel cartridge 206 also includes a first electrical contact 240 and a second electrical contact 242. Each of the first and second electrical contacts 240 and 242 is supported by the top 236 of the housing 230. Each of the first and second electrical contacts 240 and 242 can be formed from any suitable electrically conductive material such as, for example: aluminum; copper; brass; gold or gold-plated metal; silver; etc. The first and second electrical contacts 240 and 242 are respectively configured to facilitate electrical coupling between an electric heating element (not shown in FIG. 2, refer to FIGS. 2A–2C) of the fuel cartridge 206 and a heater control (not shown in FIG. 2, refer to FIG. 1).

It is to be understood that the housing 230 can be optionally formed as either a two-piece or a three-piece construction. In a two-piece embodiment of the housing 230, the side wall 232 is formed integrally with either the bottom 234 or the top 236, with the outstanding element (bottom 234 or top 236) coupled to the side wall 232 after assembly of the balance of the fuel cartridge 206, described hereafter. In a three-piece embodiment of the housing 230, each of the side wall 232, the bottom 234, and the top 236 is formed as a separate, discrete element and is suitably coupled with others during assembly of the fuel cartridge 206.

In any case, the housing 230 is generally configured to define an internal chamber (not shown) that supports a plurality of other elements of the fuel cartridge 206, respectively depicted in FIGS. 2A–2C and 3A–3B and described in detail hereafter.

Figure 2A:
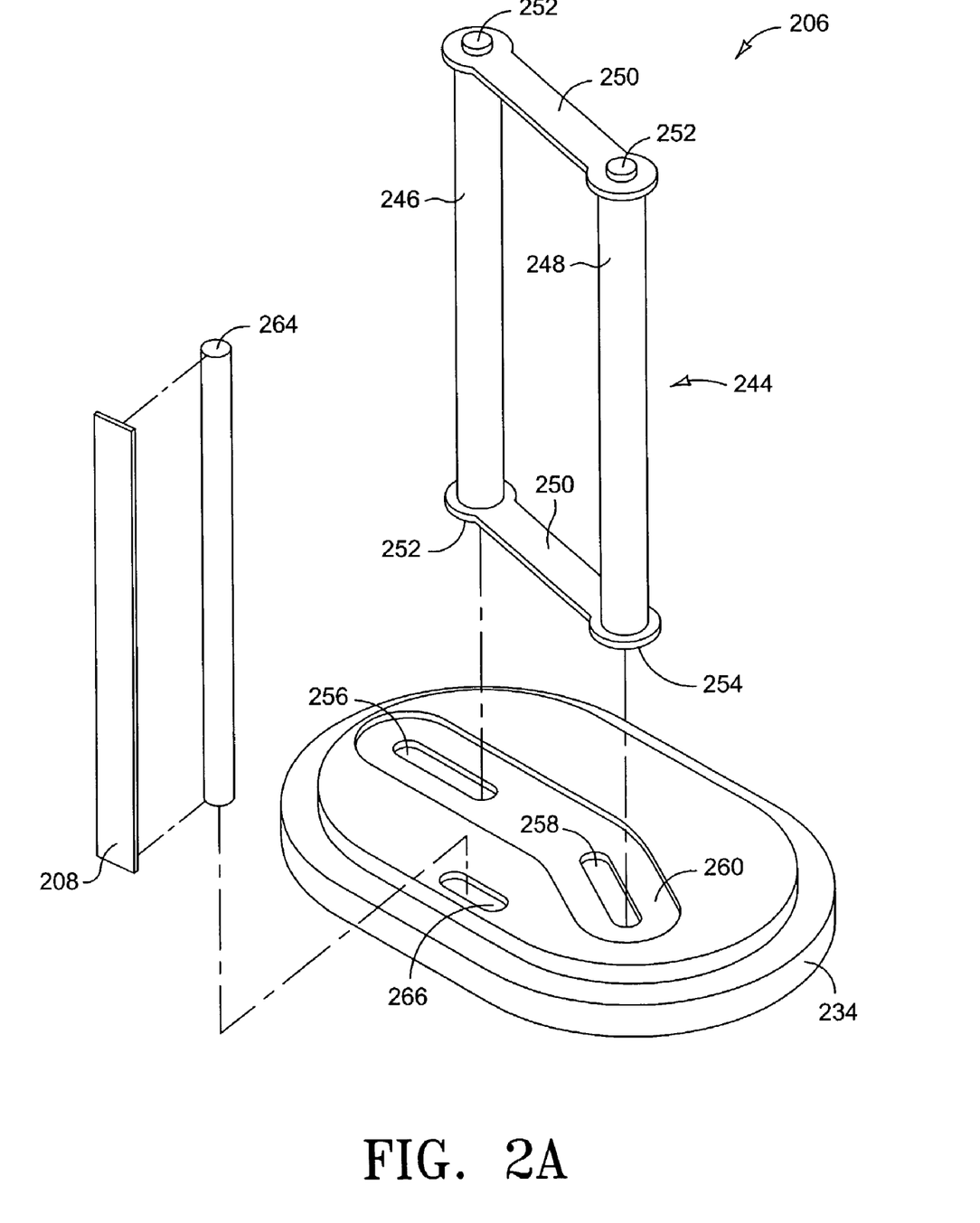
FIGS. 2A, 2B, and 2C are respective perspective views depicting details of the fuel cartridge of FIG. 2.
Figure 2B:
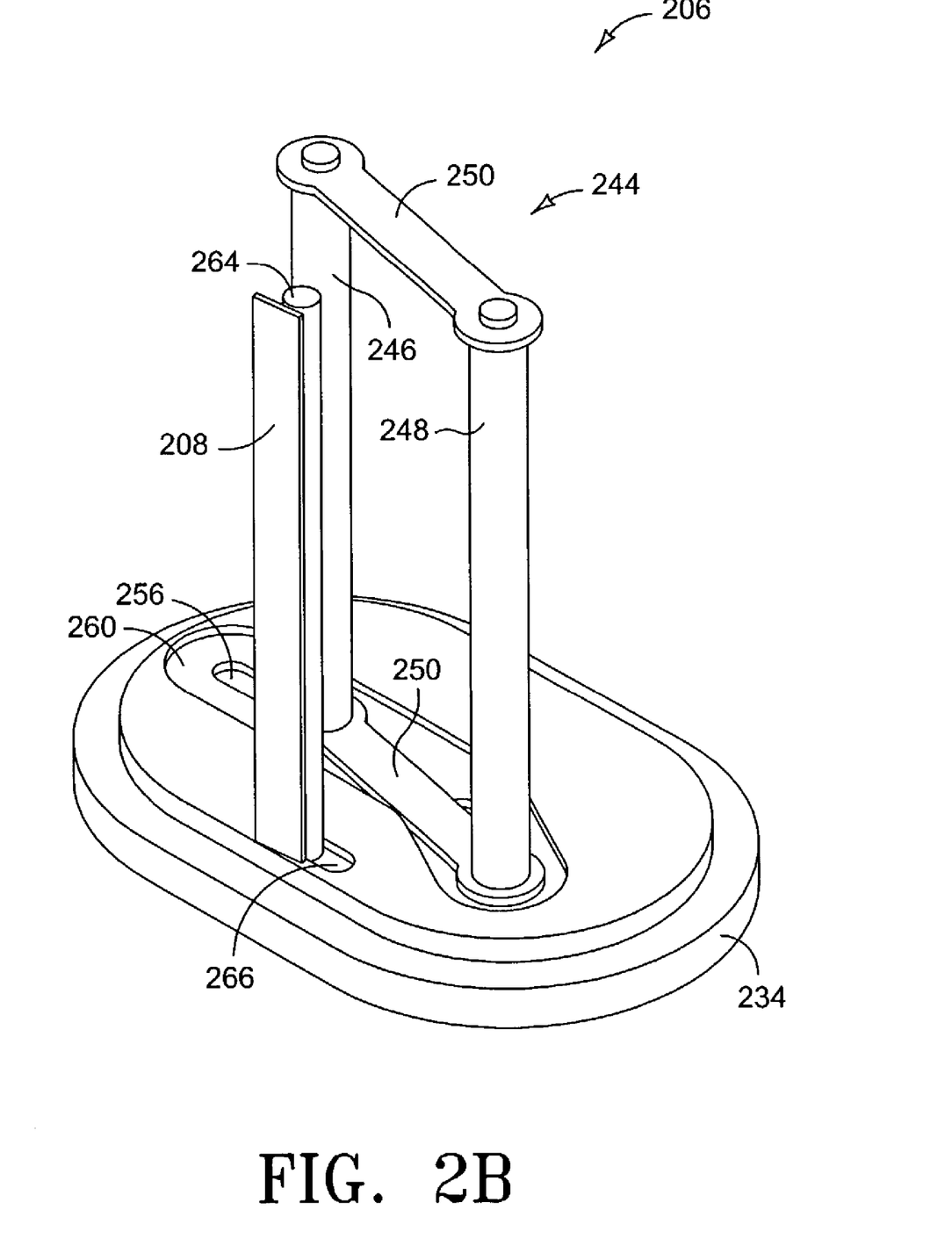
Figure 2C:
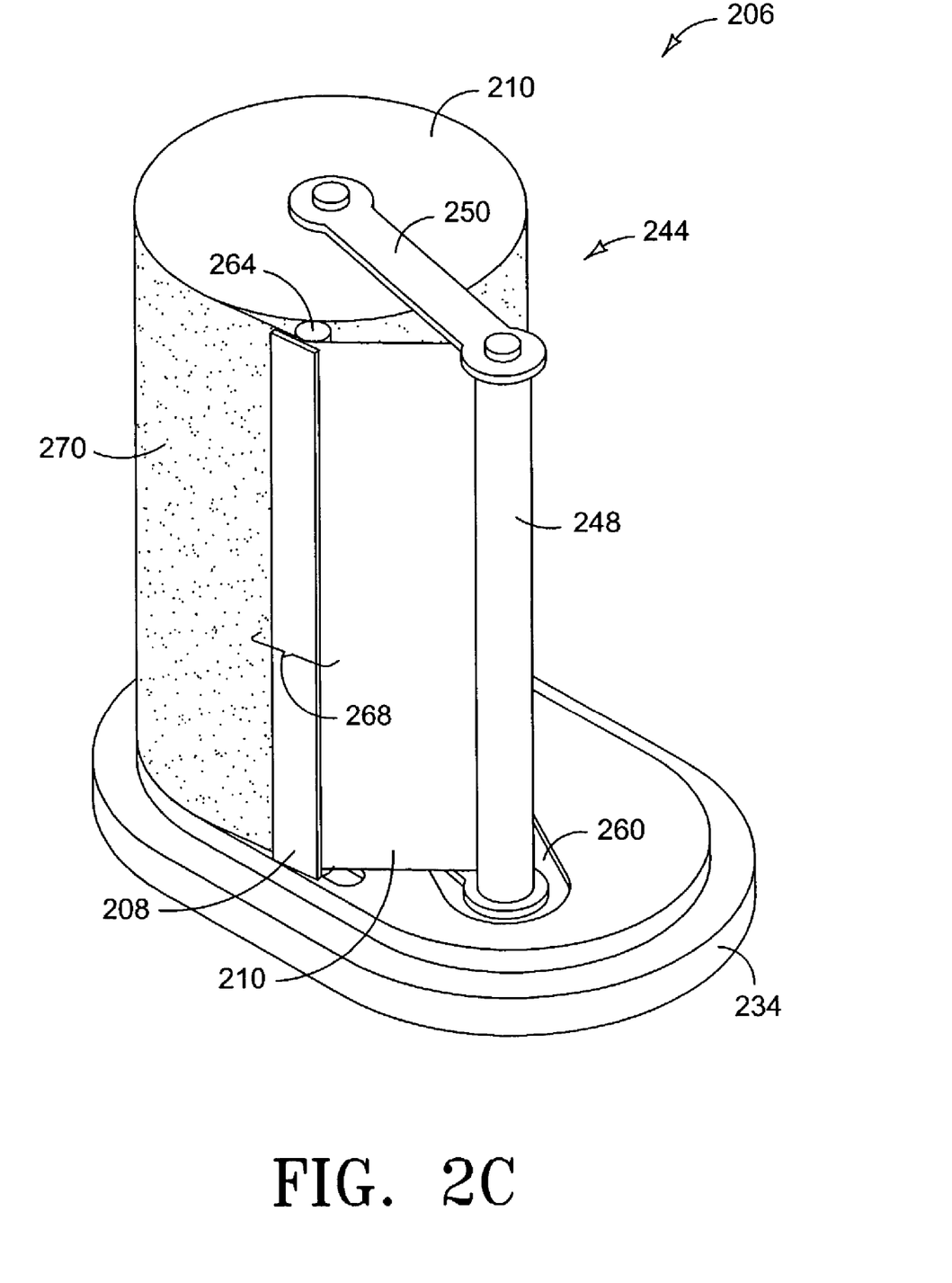

FIGS. 2A–2C are respective perspective views depicting details of the fuel cartridge 206 of FIG. 2. Simultaneous reference is now made to FIGS. 2A–2C. The fuel cartridge 206 further includes a separator assembly 244. The separator assembly 244 includes a pair of spacers 250, a supply reel 246, and a takeup reel 248. Each of the pair of spacers 250 is configured to rotationably support the supply reel 246 and the takeup reel 248 in a substantially constant-distance, spaced-apart relationship with each other. By 'rotationably support', it is meant that the supply reel 246 and the takeup reel 248 are each supported so as to rotate about a respective central axis. Each of the spacers 250 can be formed from any suitable material such as, for example, plastic, metal, etc. Furthermore, the supply reel 246 and the takeup reel 248 can be respectively formed from any suitable material, non-limiting examples of which include plastic, metal, etc.

The supply reel 246 includes a pair of oppositely-disposed supply end portions 252. Similarly, the takeup reel 248 includes a pair of oppositely-disposed takeup end portions 254. The bottom 234 includes a supply slider channel 256 and a takeup slider channel 258, each of which is formed and located in a slider depression region 260 of the bottom 234. The supply slider channel 256 and the takeup slider channel 258 are configured to receive a supply end portion 252 and a takeup end portion 254, respectively. In this way, the entirety of the separator assembly 244 is supported by the bottom 234 in a sliding relationship therewith, limited by the respective dimensions of the supply slider channel 256 and the takeup slider channel 258.

It is to be understood that the top 236 (refer to FIG. 2) includes a corresponding supply slider channel, a takeup slider channel, and a slider depression region (not shown, respectively) that are formed and located in the top 236 in a substantially mirror-image relationship with the supply slider-channel 256 and the takeup slider channel 258 and the slider depression region 260 of the bottom 234, respectively, and are cooperatively disposed therewith during overall assembly of the fuel cartridge 206. Thus, each of the bottom 234 and the top 236 is respectively configured to receive a supply end portion 252 and a takeup end portion 254 such that the separator assembly 244 is supported in slidable relationship with the housing 230 of the fuel cartridge 206.

The fuel cartridge 206 also includes a film strip 210. The film strip 210 is formed as a length of continuous, generally flexible strip material, and can be formed from any suitable flexible, non-electrically conductive material such as, for example: Teflon®; Sclair®; polyester; Tefzel®); Mylar®); paper; etc. Teflon®, Tefzel®, and Mylar® are respective registered marks owned by E. I. du Pont de Nemours and Company, Wilmington, Del. Sclair® is a registered mark owned by Nova Chemicals (International), Switzerland.

The film strip 210 is configured to support a fuel compound 270. The fuel compound 270 is any suitable fuel compound that contains hydrogen that can be liberated (i.e., released) from the fuel compound 270 by way of the application of heat. In one embodiment, the fuel compound 270 includes borohydride. Other fuel compounds 270 can also be used.

The fuel compound 270 can be applied to the film strip 210 by any of a number of suitable methods such as, for example: Roller coating by cool lamination; spray coating under generally cool (ambient) conditions; etc. The fuel compound 270 can be formed of borohydride or another suitable fuel that releases hydrogen upon heating, in is bound within the matrix of a polymeric material such as an acrylate or styrene-butadiene type polymers. In one exemplary embodiment, the fuel compound 270 includes borohydride and bees wax, wherein the bees wax serves to suitably adhere the fuel compound 270 to the film strip 210. Other fuel compounds 270, and materials and methods for application of the fuel compound 270 to the film strip 210, can also be used.

As depicted in FIG. 2C, the film strip 210 is substantially supported in a spirally wound configuration about the supply reel 246, with a leading end of the film strip 210 mechanically coupled to the takeup reel 248. Further elaboration of the film strip 210 is provided hereafter in regard to the typical operation of the fuel cartridge 206.

The fuel cartridge 206 also includes an electric heating element 208. As depicted in FIGS. 2A–2C, the electric heating element 208 is assumed to be defined by (i.e., includes, or is formed by) a resistor. Other embodiments of electric heating element 208 (not shown) can also be used. The electric heating element 208 is electrically coupled to the first and second electrical contacts 240 and 242 of FIG. 2, and is configured to controllably produce heat in response to the controlled provision of electrical energy to the electric heating element 208 by way of a heater control (not shown, refer to FIG. 1).

The fuel cartridge 206 further includes a film guide 264. The film guide 264 can be formed from any suitable material such as plastic, metal, etc., and is configured to generally support the electric heating element 208. The film guide 264 is partially received in a guide slider channel 266 formed in the bottom 234 of the housing 230, and is supported thereby in slidable relationship with the housing 230 of the fuel cartridge 206. It is to be understood that a corresponding guide slider channel (not shown) is also present in the top 236 of the housing 230, and is cooperative with the film guide 264 in substantially the same way as the guide slider channel 266 of the bottom 234.

The film guide 264 is further configured to guide a usable portion 268 of the film strip 210 generally away from the supply reel 246 and to support the usable portion 268 in cooperative (i.e., usable, or heat-able) adjacency with the electric heating element 208. In this way, the electric heating element 208 can be used to liberate hydrogen gas from the fuel compound 270 of the usable portion 268 of the film strip 210.

Figure 3A:
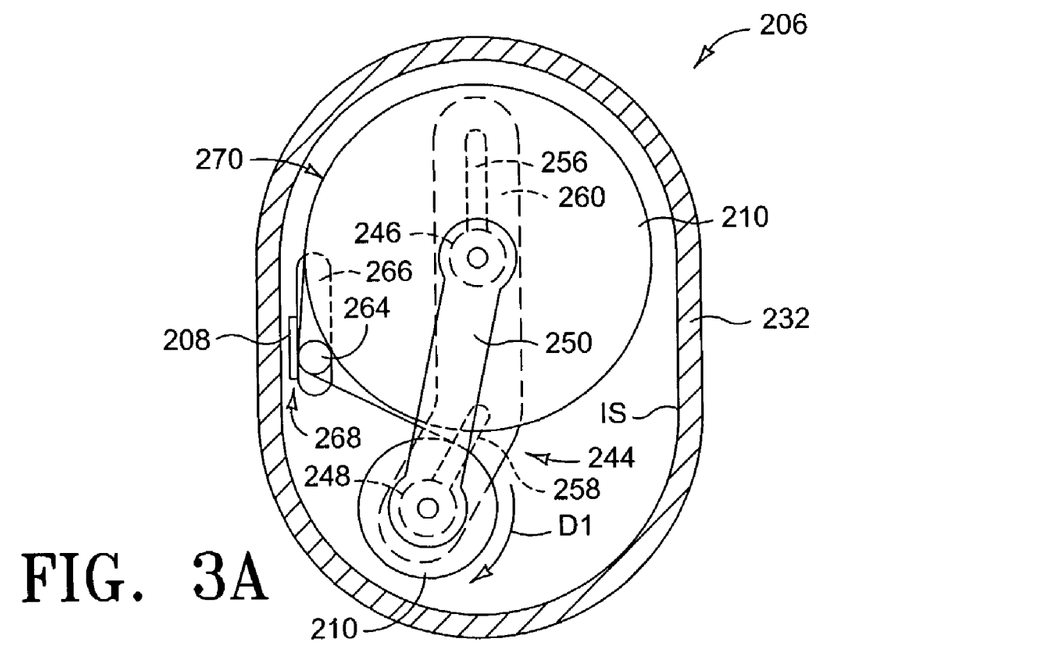
FIGS. 3A and 3B are respective plan views depicting operative details of the fuel cartridge of FIG. 2.
Figure 3B:
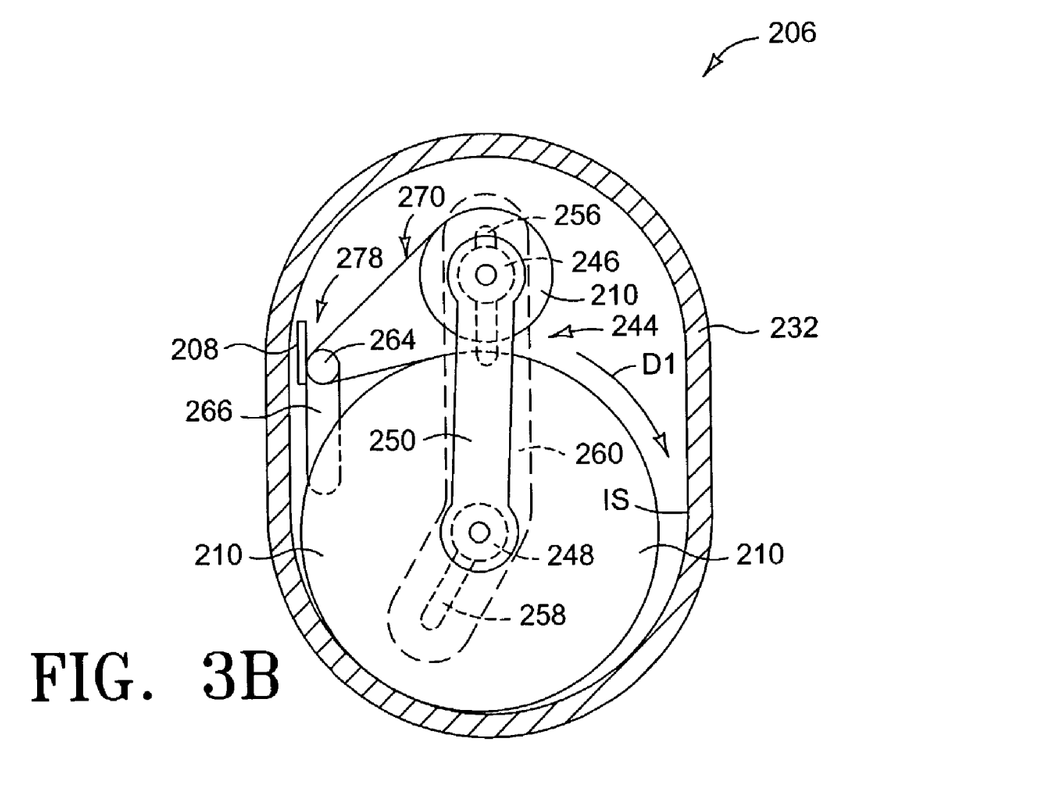

FIGS. 3A and 3B are respective plan views depicting typical operative details of the fuel cartridge 206 of FIGS. 2–2C. Reference is now directed to FIG. 3A. Typical operation of the fuel cartridge 206 is generally as follows: the supply reel 246 supports the major portion of the film strip 210 in an unused condition—that is, the fuel compound 270 supported thereon has not yet been utilized to generate (i.e., liberate) hydrogen gas. The electric heating element 208 is now controllably energized by an associated heater control (not shown; see FIG. 1), thus heating the usable portion 268 of the film strip 210. In response to the heating of usable portion 268, the fuel compound 270 supported thereon liberates hydrogen gas that is fluidly coupled away from the fuel cartridge 206 by way of the gas vents 238 (see FIG. 2). For purposes herein, the liberated hydrogen gas is assumed to be consumed by a fuel cell such as, for example, the fuel cell 102 of FIG. 1.

As operation progresses, the hydrogen content associated with the usable portion 268 of the film strip 210 becomes depleted, resulting in a corresponding decrease in hydrogen gas liberation (i.e., generation). The takeup reel 248 is then controllably rotated in the direction D1, by way an associated take-up drive (not shown; see FIG. 1) mechanically coupled to the takeup reel 248 through the takeup slider channel 258 (not shown; see FIG. 2A). In response to the rotation, the takeup reel 248 draws the just-used portion 268 of the film strip 210 away from the electric heating element 208, and accumulates the just-used portion 268 in a generally spirally wound configuration about the takeup reel 248. Thus, the takeup reel 248 progressively accumulates the film strip 210 in a substantially used condition. Although advancement of the film strip 210 is generally described herein as being periodic, it can also be continuous.

Reference is now directed to FIG. 3B. In response to the rotation of the takeup reel 248, an unused (i.e., new or fresh) portion 278 of the film strip 210 is drawn away from supply reel 246 and is guided by the film guide 264 into cooperative adjacency with the electric heating element 208. The electric heating element 208, which is still energized, then heats the usable portion 278 of the film strip 210. In response, hydrogen gas is liberated from the fuel compound 270 supported by the usable portion 278, substantially as described above in regard to the usable portion 268.

Once the hydrogen content of the usable portion 278 is substantially depleted (i.e., liberated), the just-used portion 278 of the film strip is accumulated away from the electric heating element 208 by controlled rotation of the takeup reel 248, and yet another unused portion of the film strip 210 is drawn into cooperative adjacency with the electric heating element 208. The process described above is generally repeated, during the typical usable life of the fuel cartridge 206, until substantially all of the fuel compound 270 supported by the film strip 210 is depleted. The fuel cartridge 206 is then considered spent, and replacement thereof with a like, unused fuel cartridge 206 is generally required.

During the typical operation of the fuel cartridge 206 described above, it should be noted that the major portion of the film strip 210 is progressively transferred from the supply reel 246 to the takeup reel 248. Furthermore, it should be noted that the accumulated (i.e., used) portion of the film strip 210 supported by the takeup reel 248 generally grows until it is in contact with an inside surface "IS" of the side wall 232. Further transfer of the film strip 210 from the supply reel 246 to the takeup reel 248, by way of the film guide 264 and electric heating element 208, results in a corresponding, progressive sliding motion of the separator assembly 244 away from an original position as generally depicted in FIG. 3A, toward a later position as generally depicted in FIG. 3B.

Furthermore, the electric heating element 208 and the film guide 264 progressively slide in unison along the guide slider channel 266 in correspondence to the accumulation of the film strip 210 by the takeup reel 248. The electric heating element 208 and the film guide 264 are generally depicted in an original position in FIG. 3A, and are generally depicted in a later position in FIG. 3B.

Thus, the fuel cartridge 206 includes an overall configuration that accommodates the progressive use of (i.e., liberation of hydrogen gas from) the fuel compound 270 in a substantially self contained manner, wherein the film strip 210 is supported in an unused condition, heated (i.e., used), and accumulated in a used condition, all within the housing 230 of the fuel cartridge 206. Furthermore, the cooperative configuration of the fuel cartridge 206 results in a desirably compact, substantially volume-minimized arrangement, which provides for an overall film strip packing density (i.e., fuel storage efficiency) of approximately seventy-one percent. This packing density of the fuel cartridge 206 generally exceeds that of reel-to-reel type film strip storage and usage devices, which typically exhibit approximately fifty percent film strip packing density.

Figure 4:
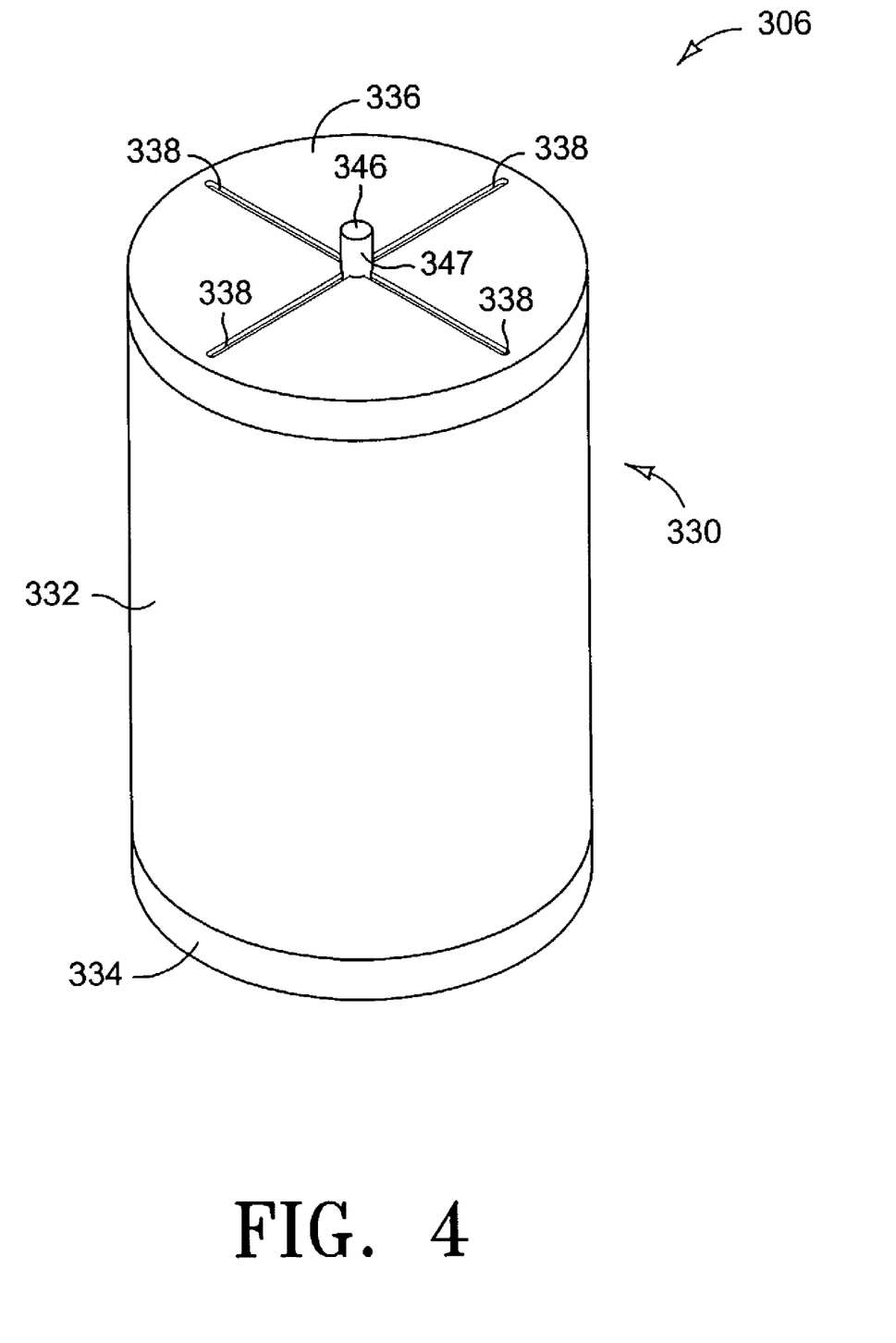
FIG. 4 is a perspective view depicting a fuel cartridge in accordance with yet another embodiment of the present invention.

FIG. 4 is a perspective view depicting a fuel cartridge 306 in accordance with another embodiment of the present invention. The fuel cartridge 306 includes a housing 330. The housing 330 includes a side wall 332. As depicted in FIG. 4, the side wall 332 includes a substantially circular cross-section, such that the side wall 332 generally defines a cylindrical shell or body tube. Other cross-sectional shapes (not shown) of the side wall 332 associated with other embodiments of the fuel cartridge 306 can also be used. The side wall 332 can be formed from any suitable, electrically non-conductive material such as, for example, plastic, polyvinyl chloride (PVC), etc.

The housing 330 also includes a bottom 334, which is suitably coupled to the side wall 332. The bottom 334 can be formed from any suitable electrically conductive material such as, for example, aluminum, copper, brass, gold or gold-plated metal, etc. The housing 330 further includes a top 336. The top 336 is suitably coupled to the side wall 332, and can be formed from any suitable electrically conductive material, such as any of the exemplary materials described above in regard to the bottom 334. The top 336 includes a plurality of through slots or apertures defined as gas vents 338. The gas vents 338 are formed in a substantially radial pattern in the top 336, and are configured to permit the fluid coupling of the fuel cartridge 306 with a fuel cell (not shown; refer to FIG. 1).

The fuel cartridge 306 also includes a reel 346. The reel 346 can be formed from any suitable material such as, for example, plastic, metal, etc. The majority of the reel 346 is supported within the housing 330 of the cartridge 306, and includes an end portion 347 that protrudes though a corresponding aperture defined by the gas vents 338 of the top 336. Further elaboration of the reel 346 is provided hereafter.

Figure 4A:
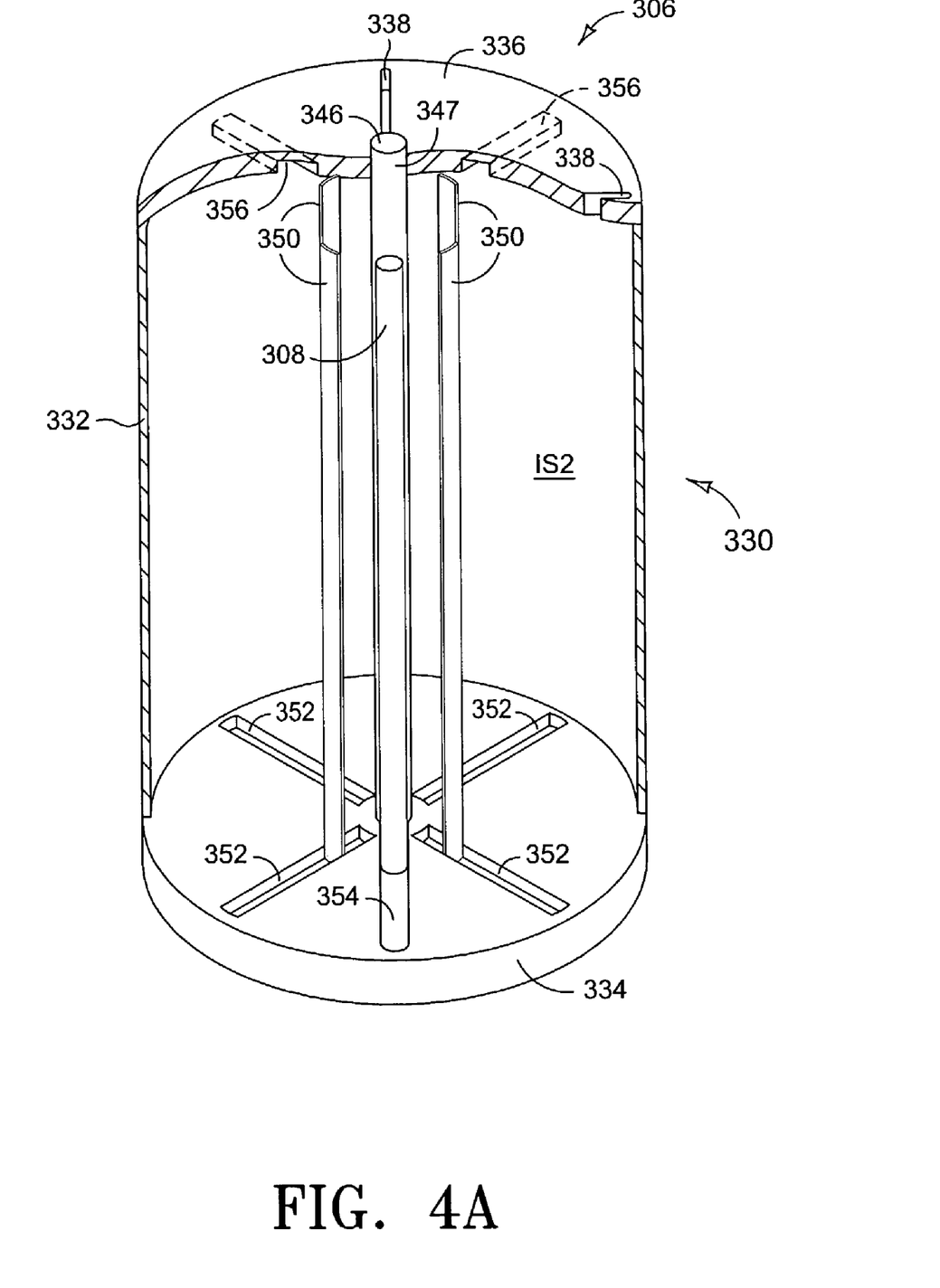
FIG. 4A is partial cutaway perspective view depicting details of the fuel cartridge of FIG. 4.

FIG. 4A is a partial cutaway perspective view depicting details of the fuel cartridge 306 of FIG. 4. The fuel cartridge 306 also includes a plurality of presser elements 350. The presser elements 350 can be formed from any suitable material such as, for example, plastic, metal, PVC, etc. Each of the presser elements 350 is supported in sliding relationship with the housing 330 by way of a corresponding lower presser channel 352 formed in the bottom 334, and a corresponding upper presser channel 356 formed in the top 336. The lower and upper presser channels 352 and 356 are formed in substantially radial patterns in the bottom 334 and the top 336 of the fuel cartridge 306, respectively. The cooperation between the presser elements 350 and the lower and upper presser channels 352 and 356, respectively, is described in further detail hereafter.

The fuel cartridge 306 further includes an electric heating element (i.e., electric heater) 308. In one embodiment, the electric heating element 308 includes a resistor. As depicted in FIG. 4A, the electric heating element 308 of the fuel cartridge 306 generally includes the shape of an elongated rod of circular cross-section. Other shapes (not shown) corresponding to other embodiments of the electric heating element 308 can also be used. The electric heating element 308 is supported in sliding relationship with the housing 330 by way of a lower heater channel 354 formed in the bottom 334, and a corresponding upper heater channel (not shown) in the top 336. In this way, the electric heating element 308 is electrically coupled to the bottom 334 and the top 336.

As depicted in FIG. 4A, the side wall 332 of the housing 330 includes an inside surface "IS2". Further elaboration of the inside surface IS2 is provided hereafter.

Figure 5A:
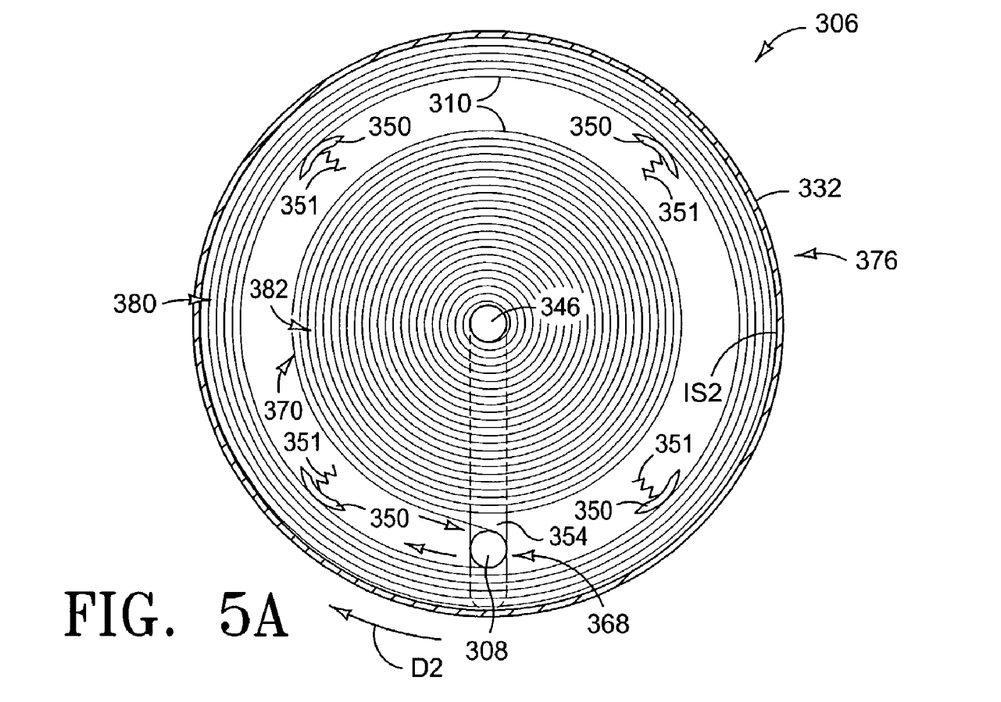
FIGS. 5A and 5B are respective plan views depicting operative details of the fuel cartridge of FIG. 4.
Figure 5B:
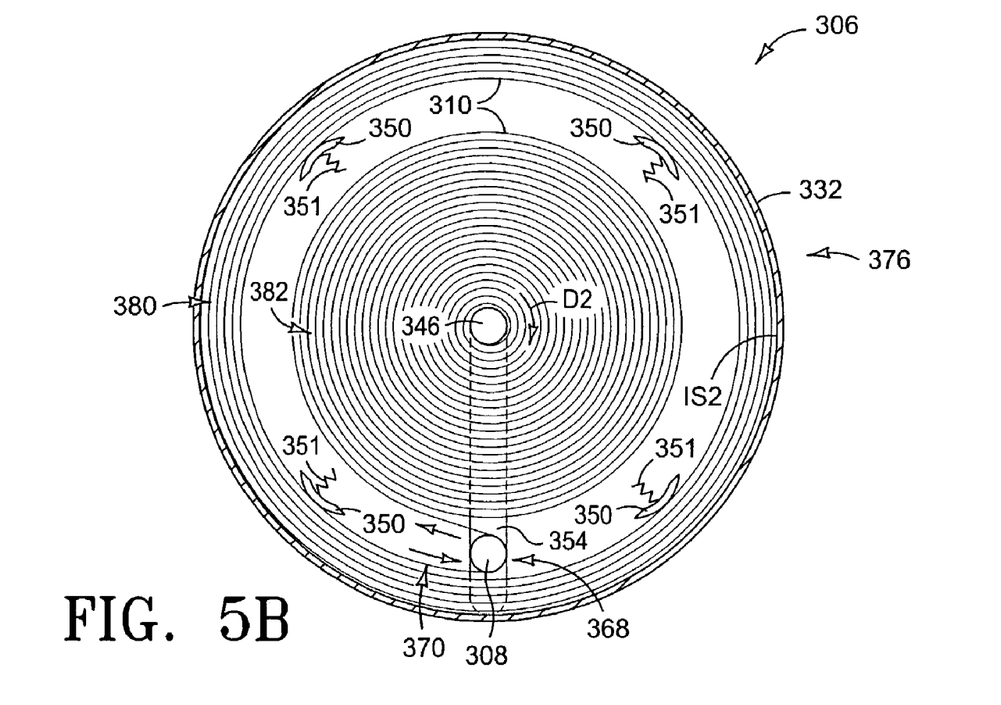

FIGS. 5A and 5B are respective plan views depicting details of the fuel cartridge 306 of FIG. 4. Reference is initially made to FIG. 5A. The fuel cartridge 306 further includes a film strip 310, supporting a fuel compound 370. The film strip 310 and the fuel compound 370 are defined, configured, and cooperative substantially as described above in regard to the film strip 210 and the fuel compound 270, respectively, of the fuel cartridge 206 of FIGS. 2–3B. Furthermore, each of the presser elements 350 is biased in a generally radial direction away from the reel 346 by way of a corresponding presser spring 351. In this way, the plurality of the presser elements 350 and the corresponding presser springs 351 collectively define a spring presser assembly 376.

A first portion 380 of the film strip 310 is substantially wound in a spiral configuration, and is supported in contact with the inside surface IS2 of the side wall 332 by way of the spring presser assembly 376. A second portion 382 of the film strip 310 is supported about the reel 346. Thus, the reel 346 and the second portion 382 of the film strip 310 supported thereon are located in substantially concentric inside relationship with the first portion 380 of the film strip 310. The fuel cartridge 306 also includes a usable portion 368 of the film strip 310 located in partially wrapped, usable adjacency (i.e., direct contact) with the electric heating element 308.

Typical operation of the fuel cartridge 306 as depicted in FIG. 5A is generally as follows: the electric heating element 308 is energized by way of a heater control (not shown, see FIG. 1) electrically coupled to the bottom 334 and the top 336 of the fuel cartridge 306. In response to the heating, hydrogen gas is liberated from the fuel compound 370 supported by the usable portion 368 of the film strip 310. This hydrogen gas exits the fuel cartridge 306 through the gas vents 338 (FIG. 4), and is fluidly coupled to an associated fuel cell (not shown, see FIG. 1).

During the course of normal operation, the hydrogen content of the fuel compound 370 supported by the usable portion 368 is substantially depleted. In response, the side wall 332 of the housing 330 is controllably rotated in a direction designated as D2, with respect to the electric heating element 308 and the spring presser assembly 376, by way of corresponding take-up drive (not shown; see FIG. 1). The just-used portion 368 of the film strip 310 is accumulated away from the electric heating element 308, and joins the existing first portion 380 of the film strip 310 supported by the spring presser assembly 376 in response to the rotation. Thus, the first portion 380 of the film strip 310 is in a substantially used condition, as depicted within the context of FIG. 5A.

In response to the accumulation of the just-used portion 368 of the film strip 310, an unused portion of the second portion 382 of the film strip 310 is provided (supplied) into usable adjacency with the electric heating element 308 by the reel 346. As such, the reel 346 can be defined as a supply reel, and the second portion 382 of the film strip 310 is in substantially unused (new) condition, within the context of the fuel cartridge 306 depicted by FIG. 5A.

As normal operation progresses, the electric heating element 308 slides along the lower heater channel 354 and the corresponding upper heater channel (not shown) in response to the accumulation of the used first portion 380 of the film strip 310 by the spring presser assembly 376. In this way, the electric heating element 308 progressively moves to accommodate the accumulation of the used film strip 310, in a direction generally toward the reel 346, while maintaining electrically conductive coupling with the bottom 334 and the top 336. Other normal operating characteristics of the fuel cartridge 306 are substantially the same as that described above in regard to the fuel cartridge 206 of FIGS. 2-3B.

FIG. 5B depicts the fuel cartridge 306 described above in regard to FIG. 5A. However, normal operation of the fuel cartridge 306 within the context of FIG. 5B differs from that of FIG. 5A, as follows: When the fuel composition 370 supported by the usable portion 368 of the film strip 310 is substantially depleted of hydrogen, the reel 346 is controllably rotated in the direction D2, with respect to the electric heating element 308 and the spring presser assembly 376. In response to the rotation of the reel 346, the just-used portion 368 of the film strip 310 is accumulated away from the electric heating element 308, and joins the existing second portion 382 supported by the reel 346. As such, the reel 346 can be defined as a takeup reel, and the second portion 382 of the film strip 310 is in a substantially used condition within the context of FIG. 5B.

In response to the accumulation of the just-used portion 368 by the reel 346, an unused portion of the first portion 380 of the film strip 310 is supplied into usable adjacency with the electric heating element 308. Thus, the first portion 380 of the film strip 310 is in a substantially unused (new) condition within the context of FIG. 5B. Other normal operation of the fuel cartridge 306 as depicted by FIG. 5B is substantially the same as that depicted by FIG. 5A.

Therefore, the fuel cartridge 306 is operable in two generally distinct modes: a first mode, as depicted in FIG. 5A, wherein the film strip 310 is progressively transferred away from the reel 346 and is accumulated against the inside surface IS2 of the side wall 332; and a second mode, as depicted in FIG. 5B, wherein the film strip 310 is progressively transferred away from the side wall 332 and is accumulated by the reel 346. In both modes, the electric heating element 308 and the presser elements 350 of the spring presser assembly 376 respectively slide in accordance with the transfer of the film strip 310. Furthermore, the spring presser assembly 376 generally operates to support the first portion 380 of the film strip 310 in a slightly gapped, spaced-apart relationship with the second portion 382 of the film strip 310.

In another embodiment (not shown), the fuel cartridge 306 includes an adhesive supported by one side of the film strip 310, so as to assist in maintaining the substantially spirally wound configuration of the first portion 380 of the film strip 310. This adhesive can be selected from any suitable adhesive that so assists in maintaining such a configuration, while also permitting the transfer of the film strip 310 in the two general operating modes of the fuel cartridge 306 described above. One of skill in the related arts is aware of such suitable adhesives.

Thus, the fuel cartridge 306 of the present invention provides for a desirably compact apparatus that is configured to controllably provide hydrogen gas to a fuel cell, by supporting and utilizing the film strip 310 in a substantially space-optimized, concentrically spirally wound configuration. The fuel cartridge 306 provides a film strip packing density typically in excess of ninety percent. This packing density aspect of the fuel cartridge 306 is substantially greater than the fifty percent or so that is typically exhibited by reel-to-reel type configurations.

Figure 6:
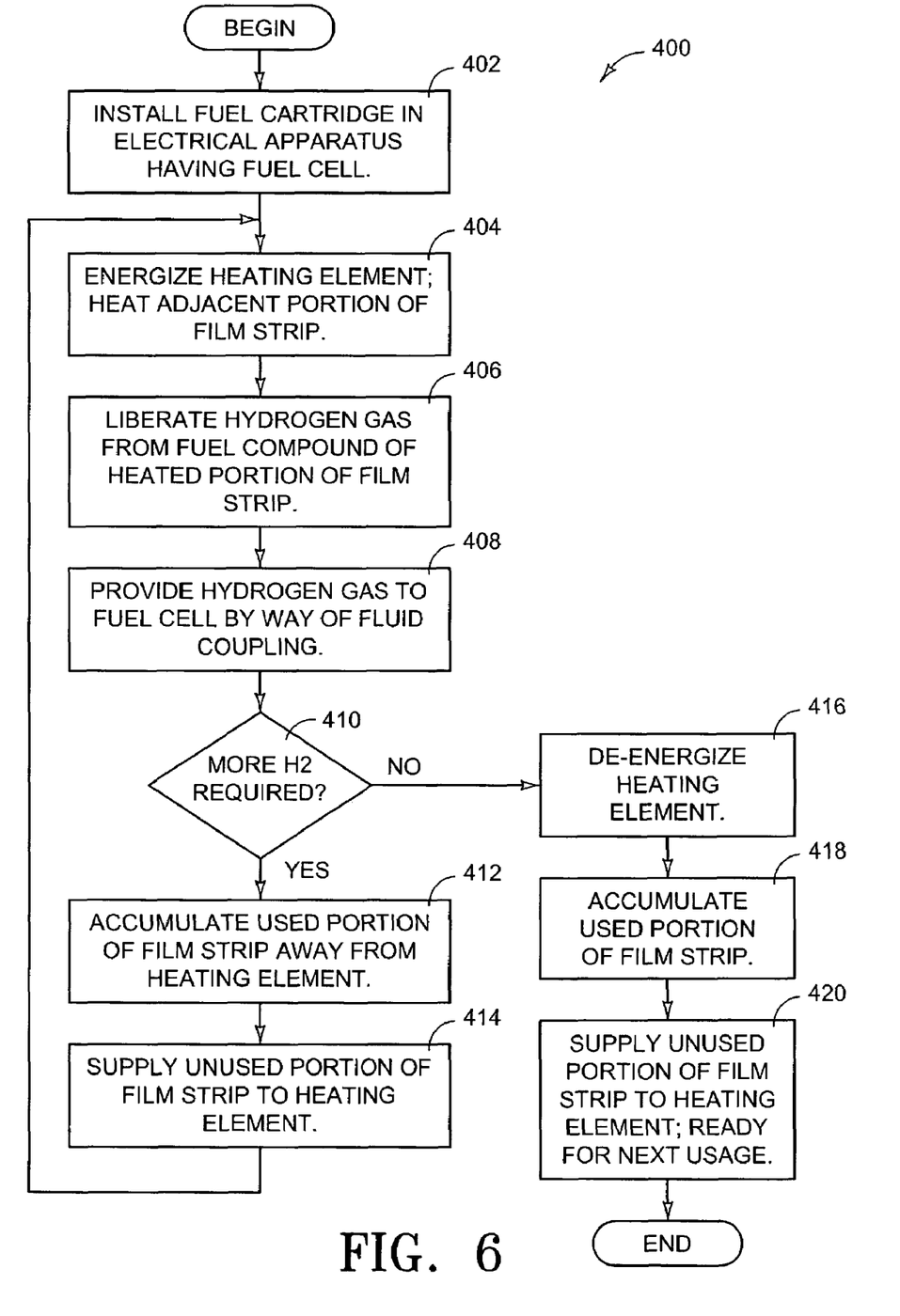
FIG. 6 is a flowchart depicting a method in accordance with yet another embodiment of the present invention.

FIG. 6 is a flowchart depicting a method 400 in accordance with the present invention. For clarity of understanding, the method 400 is described within the contexts of the electrical apparatus 100 of FIG. 1, and the fuel cartridge 206 of FIGS. 2–3B. However, it is to be understood that the method 400 is generally applicable to any embodiment of the present invention, and that other specific methods corresponding to other embodiments of the fuel cartridge of the present invention can also be used.

In step 402, an unused (new) fuel cartridge 206 (FIG. 2) is installed within the electrical apparatus 100 (FIG. 1). The takeup reel 248 (FIG. 2A) of the fuel cell 206 is mechanically coupled to the take-up drive 112 (FIG. 1). Also, the electric heating element 208 (FIG. 2A) is electrically coupled to the heater control 114 (FIG. 1) by way of the first and second electrical contacts 240 and 242 (FIG. 2), respectively.

In step 404 (FIG. 6), the heater control 114 (FIG. 1) energizes the electric heating element 208 (FIG. 2A) in response to a corresponding control signal from the controller 104 (FIG. 1). The electric heating element 208 (FIG. 2A) produces heat in correspondence to the magnitude of the energization (i.e., electrical power) provided by the heater control 114 (FIG. 1), which is thermally transferred to the usable portion 268 (FIG. 2C) of the film strip 210.

In step 406 (FIG. 6), fuel compound 270 (FIG. 2C) supported by the heated, usable portion 268 of the film strip 210 liberates hydrogen gas H2 in response to the heating.

In step 408 (FIG. 6), the hydrogen gas H2 is fluidly coupled to the fuel cell 102 (FIG. 1). The fuel cell 102 receives the hydrogen gas H2, and uses it in combination with oxygen O2 from the ambient air to generate electrical energy. This generated electrical energy is then received and suitably conditioned by the controller 104, and is in turn supplied to the electric load 120 of the electrical apparatus 100. The electric load 120 then performs one or more normal, predetermined functions in response to the provision of the conditioned electrical energy.

In step 410 (FIG. 6), the controller 104 (FIG. 1), by way of suitable parameter sensing coupled to the fuel cell 102, determines if additional hydrogen gas H2 is required from the fuel cartridge 206 (FIG. 2). If additional hydrogen gas H2 is required, then the method 400 (FIG. 6) proceeds to step 412. If additional hydrogen gas H2 is not required, then the method 400 proceeds to step 416. For purposes of example, it is assumed that additional hydrogen is required, and the method 400 proceeds to step 412.

In step 412, the controller 104 (FIG. 1) issues a control signal to the take-up drive 112, in response to the determination of step 410 (FIG. 6) above. The take-up drive 112 (FIG. 1) then provides a controlled rotation of the takeup reel 248 (FIG. 2C) of the fuel cartridge 206, in response to the control signal. The takeup reel 248 then accumulates the now-used portion 268 of the film strip 210 away from the electric heating element 208.

In step 414 (FIG. 6), the supply reel 246 (FIG. 2B) supplies an unused portion of the film strip 210 (FIG. 2C) into usable adjacency with the electric heating element 208, in direct correspondence (i.e., substantial equality) with the just-used portion 268 accumulated by the takeup reel 248 in step 412 (FIG. 6) above. The method now proceeds back to step 404 above. The method 400 generally repeats the steps 404 through 414, in a substantially iterative fashion, until the controller 104 (FIG. 1) determines that additional hydrogen gas H2 is not required at step 410. (FIG. 6) Such a determination can be made, for example, as a result of a user issued shut-down command to the controller 104 (FIG. 1). The method 400 (FIG. 6) then proceeds to step 416.

In step 416, the heater control 114 (FIG. 1) de-energizes the electric heating element 208 (FIG. 2C) in response to a corresponding control signal from the controller 104 (FIG. 1). The electric heating element 208 (FIG. 2C) ceases to produce heat in response to the de-energization.

In step 418 (FIG. 6), the take-up drive 112 (FIG. 1) provides a controlled rotation to the takeup reel 248 (FIG. 2C) of the fuel cartridge 206, in response to a corresponding control signal from the controller 104 (FIG. 1). In response to the controlled rotation, the takeup reel 248 (FIG. 2C) accumulates the portion 268 of the film strip 210 away from the electric heating element 208.

In step 420 (FIG. 6), the supply reel 246 (FIG. 2B) supplies an unused portion (i.e., a new portion 268, FIG. 2C) of the film strip 210 into usable adjacency with the electric heating element 208 in correspondence to the accumulation of step 418 (FIG. 6) above. This new, unused portion 268 (FIG. 2C) is now positioned for immediate use at some time in the future. The method 400 (FIG. 6) is now complete.

It will be appreciated that the flowchart 400 depicted in FIG. 6 is exemplary only, and that certain steps can be deleted, modified, or rearranged, and that other steps can be added, all within the scope of the present invention.

Embodiments of the present invention can be generally summarized as follows: Fuel cartridges configured for use with a fuel cell or fuel cells are provided. Each fuel cartridge includes a length of film strip that supports a fuel compound containing hydrogen. The hydrogen content of the fuel compound is controllably liberated by heating a portion of the supporting film strip with an electric heating element supported substantially within the fuel cartridge. Each fuel cartridge is suitably configured to provide the liberated hydrogen gas to a fuel cell or fuel cells. As the hydrogen content supported by a heated portion of the film strip is depleted, a controlled mechanical rotation coupled to the fuel cartridge serves to draw the used portion of the film strip away from the electric heating element, and to supply an unused portion of the film strip into cooperative adjacency with the electric heating element.

Furthermore, the normal, hydrogen-supplying operation of the fuel cartridge can be performed in iterative steps of varying lengths of time each, or as a continuously controlled operation, as desired, until the overall hydrogen content of a fuel cartridge is depleted. At such time, a depleted fuel cartridge is readily replaceable with a like fuel cartridge in non-depleted (i.e., new) condition. The fuel cartridges of the present invention provide respective fuel storage and provision configurations of substantially reduced overall size (i.e., volume) and replacement times as compared to known apparatus and methods. Further still, respective embodiments of the fuel cartridge of the present invention exhibit film strip packing densities that are generally desirable in comparison to those of typical reel-to-reel type configurations.

While the above methods and apparatus have been described in language more or less specific as to structural and methodical features, it is to be understood, however, that they are not limited to the specific features shown and described, since the means herein disclosed comprise preferred forms of putting the invention into effect. The methods and apparatus are, therefore, claimed in any of their forms or modifications within the proper scope of the appended claims appropriately interpreted in accordance with the doctrine of equivalents.

We claim:

1. A fuel cartridge for use with a fuel cell, comprising:
a film strip supporting a fuel compound containing hydrogen;
an electric heater configured to controllably heat a usable portion of the film strip in response to electrical energy provided by a heater control, wherein the fuel compound is configured to liberate a hydrogen gas from the heated usable portion of the film strip, and further wherein the fuel cartridge is configured to provide the hydrogen gas to the fuel cell by way of a fluid coupling there between;
a first electrical contact and a second electrical contact respectively supported by the fuel cartridge, wherein the electric heater includes a resistor electrically coupled to each of the first electrical contact and the second electrical contact; and
a reel configured to support a portion of the film strip, wherein the fuel cartridge is configured to support the film strip and the electric heater and the reel in a substantially self contained arrangement.

2. The fuel cartridge of claim 1, and wherein:
the reel is a takeup reel;
the fuel cartridge further comprises a supply reel supported in substantially constant spaced relationship with the takeup reel;
the takeup reel is configured to controllably accumulate a used portion of the film strip away from the electric heater in response to a controlled rotation of the takeup reel provided by a drive mechanism; and
the supply reel is configured to supportingly supply an unused portion of the film strip to the electric heater in correspondence to the controlled accumulation of the used portion of the film strip by the takeup reel.

3. The fuel cartridge of claim 1, and wherein the fuel compound includes borohydride.

4. The fuel cartridge of claim 1, and wherein the heater control is located externally to the fuel cartridge, and the heater control is electrically coupled to each of the first and second electrical contacts.

5. The fuel cartridge of claim 1, and further comprising a spring presser assembly, and wherein:
the reel is defined as a takeup reel;
the spring presser assembly is configured to support a portion of the film strip in a substantially spirally wound configuration;
the takeup reel is configured to controllably accumulate a used portion of the film strip away from the electric heater in response to a controlled rotation of the takeup reel provided by a drive mechanism; and
the spring presser assembly is further configured to provide an unused portion of the film strip to the electric heater in correspondence to the controlled accumulation of the used portion by the takeup reel.

6. The fuel cartridge of claim 1, and further comprising a spring presser assembly, and wherein:
the reel is defined as a supply reel;
the spring presser assembly is configured to support a portion of the film strip in a substantially spirally wound configuration;
the spring presser assembly is configured to controllably accumulate a used portion of the film strip away from the electric heater in response to a controlled rotation of the fuel cartridge provided by a drive mechanism; and
the supply reel is further configured to provide an unused portion of the film strip to the electric heater in correspondence to the controlled accumulation of the used portion by the spring presser assembly.

7. The fuel cartridge of claim 1, and wherein the fuel cartridge is configured to provide the liberated hydrogen gas to the fuel cell by way of a fluid coupling there between.

8. The fuel cartridge of claim 2, and wherein the drive mechanism is located externally of the fuel cartridge.

9. The fuel cartridge of claim 2, and wherein the drive mechanism includes a spring supported by the fuel cartridge.

10. The fuel cartridge of claim 1, and wherein the film strip includes an adhesive configured to support at least a portion of the film in a substantially spirally wound configuration.

11. A fuel cartridge for use with a fuel cell, comprising:
a housing;
a film strip supported within the housing, the film strip supporting a fuel compound containing hydrogen;
a supply reel supported substantially within the housing and configured to support an unused portion of the film strip;
an electric heating element supported within the housing and configured to controllably heat a portion of the film strip in response to an energizing of the electric heating element by a correspondingly coupled heater control, wherein the fuel compound is configured to liberate a hydrogen gas from the heated portion of the film strip, and the housing is further configured to provide the liberated hydrogen gas to the fuel cell by way of a fluid coupling there between;
a first electrical contact and a second electrical contact respectively supported by the housing, wherein the electric heating element includes a resistor that is electrically coupled to each of the first electrical contact and the second electrical contact; and
a takeup reel supported substantially within the housing and configured to controllably accumulate a used portion of the film strip away from the electric heating element in response to a controlled rotation of the takeup reel by a correspondingly coupled drive mechanism, and wherein an unused portion of the film strip is drawn from the supply reel to the electric heating element in correspondence to the accumulation of the used portion of the film strip by the takeup reel.

12. The fuel cartridge of claim 11, and wherein:
the supply reel and the takeup reel are both rotationably supported by a separator assembly in substantially constant spaced relationship with each other; and
the separator assembly is slidably supported by the housing such that the supply reel and the takeup reel are repositioned relative to the housing in response to the accumulation of the used portion of the film strip by the takeup reel.

13. The fuel cartridge of claim 11, and wherein the fuel compound includes borohydride.

14. The fuel cartridge of claim 11, and wherein the heater control is located externally of the housing, and is electrically coupled to each of the first and second electrical contacts.

15. The fuel cartridge of claim 11, and wherein the drive mechanism is located externally of the housing.

16. The fuel cartridge of claim 11, and wherein the drive mechanism includes a spring supported by the housing, and further wherein the spring is configured to drive the controlled rotation of the takeup reel.

17. A fuel cartridge, comprising:
housing means for supporting a plurality of elements;
film strip means for supporting a fuel compound means containing hydrogen;
heating means for heating a portion of the film strip and liberating a hydrogen gas from the fuel compound means supported by the heated portion of the film strip means;
first and second contact means for coupling the heating means to a source of electrical energy;
means for providing the liberated hydrogen gas to fuel cell; and
means for accumulating a used portion of the film strip means away from the heating means in response to a controlled drive means.

18. A fuel cartridge for use with a fuel cell, comprising:
a housing;
a hydrogen bearing film supported within the housing;
a heater within the housing and configured to heat a portion of the hydrogen bearing film to thereby release hydrogen for use by the fuel cell and thereby produce a used portion of the hydrogen bearing film;
first and second electrical contacts respectively supported by the housing and configured to couple the heater to a source of electrical energy; and
wherein the used portion of the hydrogen bearing film is contained within the housing.

19. The fuel cartridge of claim 18, and further comprising a supply reel supported substantially within the housing and configured to support the hydrogen bearing film.

20. The fuel cartridge of claim 19, and further comprising a takeup reel supported substantially within the housing and configured to support the used portion of the hydrogen bearing film.

21. The fuel cartridge of claim 18, and wherein the housing includes a fluid port configured to fluidly couple the released hydrogen to the fuel cell.

* * * * *